United States Patent Office 2,876,606
Patented Mar. 10, 1959

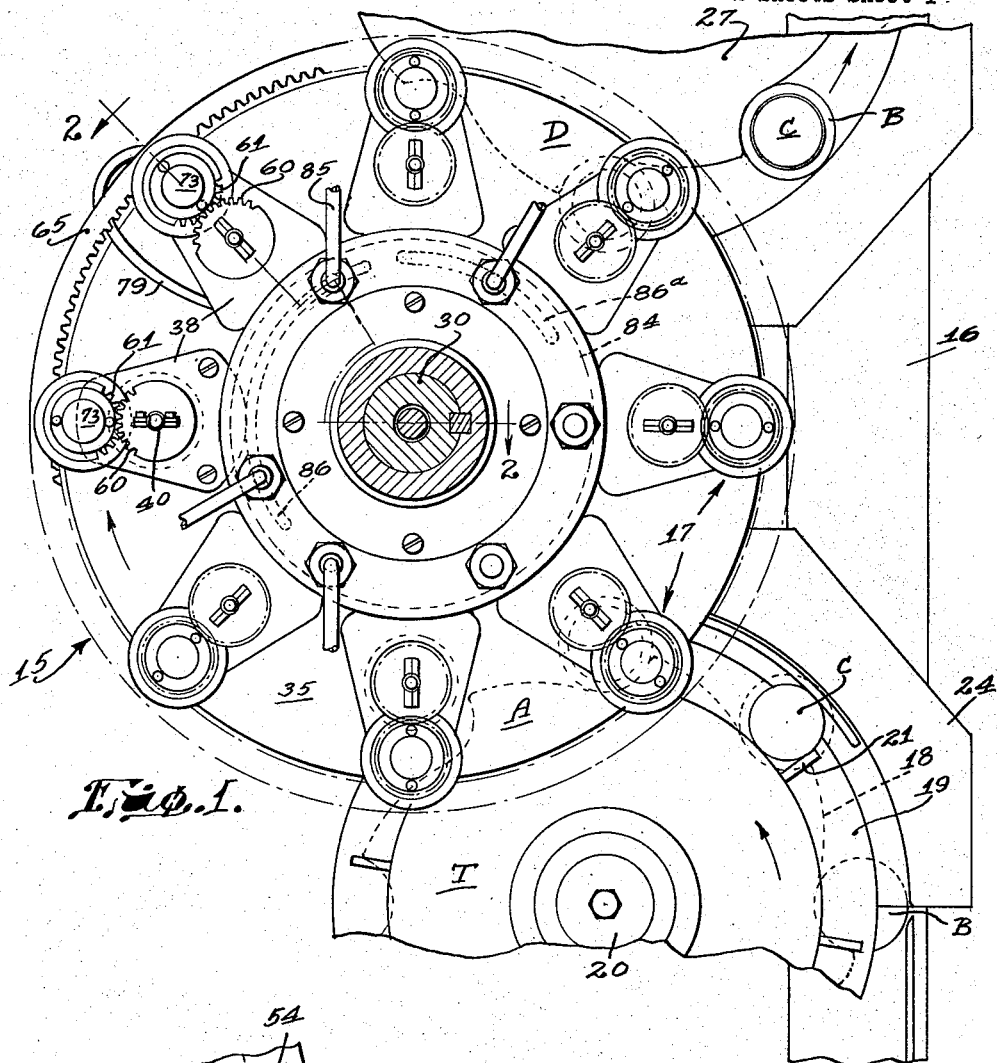

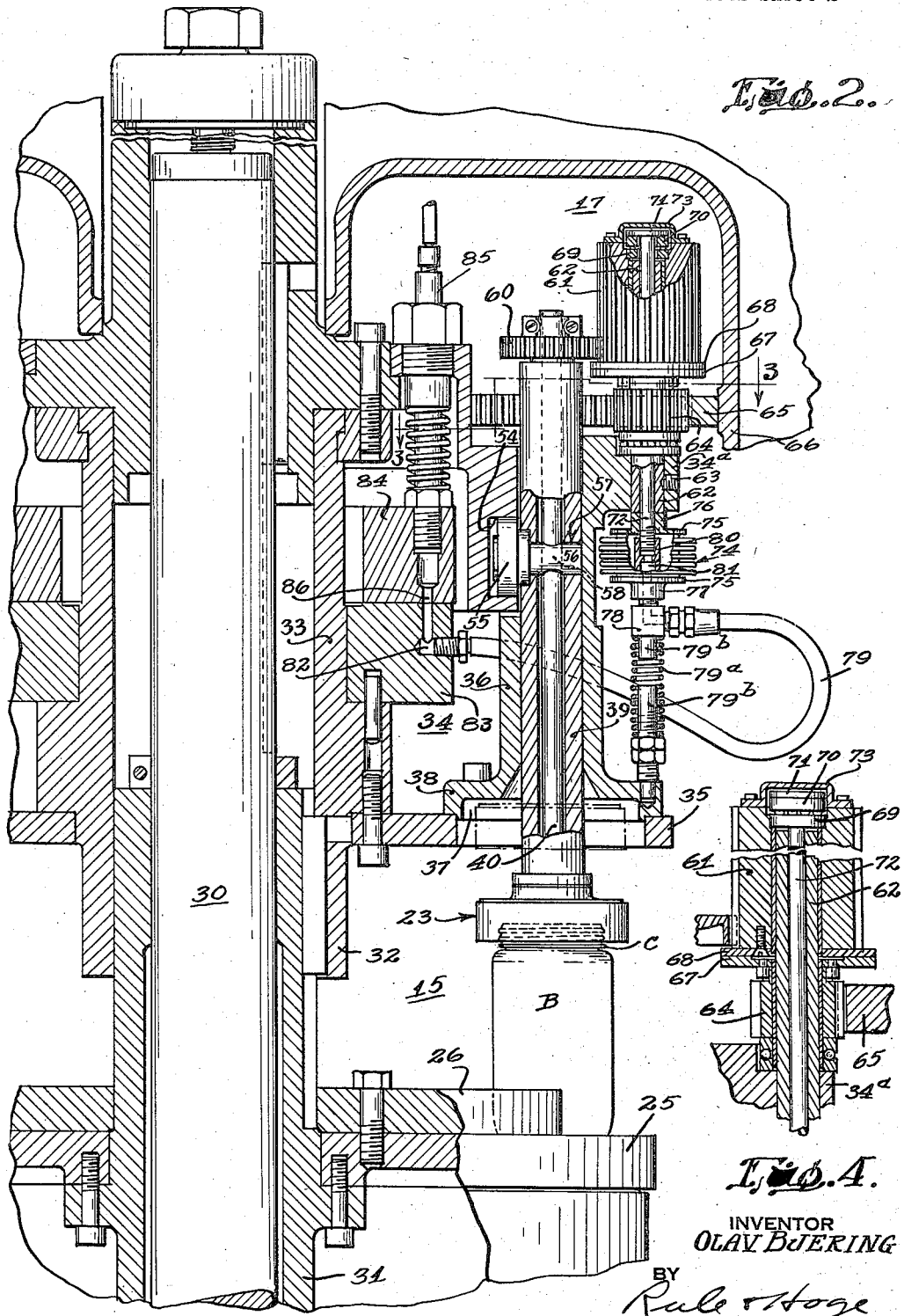

2,876,606

CONTAINER CLOSING APPARATUS

Olav Bjering, Toledo, Ohio, assignor to Owens-Illinois Glass Company, a corporation of Ohio Application August 19, 1957, Serial No. 678,940

3 Claims. (Cl. 53—317)

The present invention relates to improvements in closure cap applying machines and more especially to apparatus for attaching screw type closure caps to bottles and jars.

Among the important objects of our invention is the provision of a novel, simple and exceptionally efficient unit for imparting rotary motion to a closure cap affixing chuck, such incorporating not only means for effecting torque control in securing the caps to containers but also means for reliably insuring against too tight cap application.

A further object is the provision of a novel air operated clutch which controls functioning of mechanism for rotating a closure cap rotating chuck.

Other objects will be in part apparent and in part pointed out hereinafter.

Fig. 1 is a fragmentary plan view of a closure cap affixing machine incorporating my invention.

Fig. 2 is a vertical sectional view partly in elevation taken along the line 2—2 of Fig. 1.

Fig. 3 is a sectional plan view taken along the line 3—3 of Fig. 2.

Fig. 4 is a fragmentary detail sectional view showing the clutch and associated driving elements for rotating the closure chuck.

For illustrative purposes, I have shown the present invention as incorporated in an apparatus which forms the subject matter of my copending application, Serial Number 608,243 filed September 6, 1956, entitled Container Closing Apparatus.

By reference to Fig. 1 of the accompanying drawings, it will be observed that the container closing apparatus 15, incorporating my invention, is positioned alongside an endless horizontal conveyor 16 and mounted for continuous rotation about a vertical axis, whereby to bring the closure applying units 17 one at a time to a series of positions, or operating zones, as will be more fully explained hereinafter. In proximity to the filled container and closure cap receiving zone A of the closing apparatus 15 is a transfer unit T (Fig. 1) designed to bring filled bottles or jars B and closure caps C to said zone A. This unit comprises a star wheel 18 for advancing the bottles or jars and a rotary closure cap supporting disk 19 positioned above the star wheel 18, said star wheel and the disk being mounted for rotation with a common vertical shaft 20. As shown, the rotary disk 19 is provided on its upper surface near its periphery with an annular series of radial fingers, or abutments 21, which function to space the closure caps C apart uniformly and insure their proper delivery to the closing apparatus 15. Substantially at the entrance to the zone A these closure caps are removed from the disk 19 by the closure cap chucks 23 in any preferred fashion. The bottles B move along the conveyor 16 until the star wheel 18, together with an arcuate guide 24, remove them from this conveyor 16 and propel the bottles in succession to the receiving zone A, where they are deposited upon a rotary table 25 (Fig. 2), and in register with suitable holders 26 attached to the latter.

After the containers have been sealed, they are removed from the closing apparatus 15 in the discharge zone, or position D, by means of a continuously rotating star wheel 27 and once again deposited upon the conveyor 16, which in turn delivers such sealed containers to a packing station or table (not shown).

The closure applying units 17 (Fig. 1) are arranged in an annular series and rotatable about a stationary central column 30 (Figs. 1 and 2) and each such unit is positioned directly over one of the bottle or jar holders 26 and remains in register therewith at all times. The aforementioned table 25 and series of holders 26 are secured together and in turn mounted upon a lower sleeve 31 which encircles an intermediate portion of the stationary column 30. This sleeve 31 is splined to a downward tubular extension 32 on the upper sleeve 33 which comprises part of the rotary carriage or turret 34. A radial annular shelf 35, at the juncture of said upper sleeve 33 and the tubular extension 32, at least in part supports the closure applying units 17. Since these units 17 are identical in construction and operation, the ensuing description will be restricted to one such unit. It includes a vertical upstanding tubular guide 36 positioned coaxially with a vertical opening 37 in, and near the periphery of the shelf 35 and formed with a bottom flange 38 which provides a base portion resting upon the shelf 35. Slidingly telescoped within this guide 36 is a tubular carrier 39 for the chuck 23 and within this carrier 39 is positioned a chuck supporting rod 40 disposed coaxially with the carrier 39 and extending a short distance beyond each end of the latter. The rod 40, which is directly connected at its lower end to the chuck 23, is of somewhat smaller outside diameter than the inside diameter of the carrier 39 and, may be formed of resilient steel so that it can flex laterally in the event the chuck and a bottle therebeneath are slightly out of alignment and thereby compensate for such misalignment.

As has been pointed out heretofore, this chuck 23 is subject both to axial reciprocation vertically and to rotary motion about its own axis. Reciprocation of the chuck is obtained by means of a stationary continuous cam 54 (Figs. 2 and 3) which accommodates a cam roll 55, the latter being carried by a short horizontal rod 56 extending through diametrically opposed openings 57 in the carrier 39 and itself is formed with a vertical opening 58 which accommodates the aforementioned rod 40. Thus, it is apparent that the rod may be rotated independently of the carrier 39 and guide 36 in order to thread a closure cap upon a container and, additionally, may be reciprocated axially to move the chuck into and out of closure cap affixing position.

Rotation of the chucks 23 for the purpose of threading closure caps C onto the containers B is obtained by a pinion and ring gear mechanism (Figs. 2, 3 and 4) which may comprise a gear 60 secured to the upper end of each chuck carrying rod 40 and running in mesh with a pinion 61, the latter axially slidingly mounted upon a stationary vertical tube 62. This tube 62 extends downwardly through a flange 34ª on the carriage or turret 34. A set screw 63 (Fig. 2) secures the tube 62 against any movement whatsoever relative to the carriage. A gear 64 positioned between the pinion 61 and flange 34ª of the carriage constantly meshes with a ring gear 65 which is supported on a carriage 66. This gear 64 is freely rotatable on the aforementioned stationary tube 62 and at its upper end carries a friction clutch plate or disk 67 designed for cooperation with a similar plate or disk 68 which is provided at the lower end of the pinion 61. Through this clutch the driven gear 64 may impart rotation to the upper pinion 61 and the gear 60 at the upper end of the rod 40 as well as to the chuck supported by said rod.

Relative axial movement of these clutch plates 67 and 68 to make and break driving contact between them is obtained by axially shifting the upper pinion 61 and the clutch plate 68 thereon. This pinion 61 (Figs. 2 and 4), at its upper end is connected by a press fit to the lower ring 69 of a thrust ball bearing, such ring projecting radially inward over the upper end of the stationary tube 62. The upper ring 70 of this bearing is immediately beneath and supportingly engages a radial flange 71 at the upper end of an axial clutch actuating rod 72. A cap 73 is secured to the pinion 61 to enclose the flanged upper end of said rod and limit possible relative axial movement of the rod 72 and pinion. This rod 72 extends downwardly through the guide tube 62 and below the lower end of the latter where it enters air expansible bellows 74. This bellows 74 comprises axially spaced end walls 75, the upper of which has a hub 76 abutting the lower end of the fixed guide tube 62. The lower end wall of this bellows carries a depending hollow hub 77 which is connected through a cored block 78 to an air pressure supply pipe 79. Extending axially upward into the bellows from the lower end wall 75 is a socket 80 into the upper end of which is threaded the lower end of the operating rod 72. A radial port 81 in this socket provides communication between the hollow hub, socket and in the interior of the bellows.

The position of the pinion 61 and pressure of the clutch face plate carried thereby against the lower plate determine the application torque applied to the closure caps. Such is adjustable so that each head of the apparatus may be set as conditions require. Accordingly an adjustable expansion spring device is positioned below each bellows. It comprises a coil spring 79$^a$ telescoped over axially aligned guide rods 79$^b$, one of which depends from the cored block 78 while the other is anchored in the shelf 35 and is adjustable axially upward to regulably control the spring tension.

The air pressure supply pipe 79 leads to a port 82 in a rotatable annular ring 83 which forms a part of an air and vacuum distributor incorporated in the rotary carriage 34. A stationary upper distributor ring 84 is connected through a conduit 85 to a source of air pressure supply (not shown) and is formed with a circumferentially extending channel 86 designed for register with the successive ports 82 in a preselected zone, as the lower ring 83 rotates.

In operation, the carriage 34 rotates continuously thereby bringing jars with closure caps loosely resting thereon to the cap affixing zone. It is understood that the gear 64 is rotated continuously by reason of its meshing with the stationary ring gear 65. In the cap affixing zone, air under pressure enters the bellows 74 causing downward expansion thereof so that the pinion 61 lowers and effects driving engagement between the two clutch face plates 67 and 68. Upon completion of the capping operation and shutting off the flow of air to the bellows, the latter contracts under influence the upward expansion of the coil spring 79$^a$, and by reason of communication of the bellows with the atmosphere through the pipe 79, port 82 and an arcuate slot 86$^a$ (Fig. 1) which opens to the outside air through an aperture (not shown). By adjusting the lower shouldered rod 79$^b$ axially, the spring tension and therefore the driving effectiveness of the clutch may be adjusted as required.

Modifications may be resorted to within the spirit and scope of the appended claims.

I claim:

1. Apparatus of applying skirted screw-threaded closure caps to screw-threaded necks of bottles and jars, a rotatable circular bottle support, an annular series of cap applying chucks above the latter, means for moving the chucks vertically in a selected zone into and out of a cap affixing position comprising a vertical supporting tube connected and individual to each chuck, cam mechanism for moving the tube axially, means for rotating each chuck in said zone comprising a rod extending axially through the tube and connected to the chuck, a gear secured to the upper end of said rod, a pinion continuously in mesh with said gear, the axes of the gear and pinion being disposed vertically, a driven gear below and coaxial with the pinion, a ring gear for driving the latter gear, clutch plates on adjacent ends of the pinion and driven gear and means for moving the pinion and driven gear axially relatively to alternately engage and separate the clutch plates including air expansible bellows and means for introducing air under pressure into the bellows during at least a portion of the movement of the latter through said selected zone.

2. Apparatus as defined in claim 1, and spring means operable to aid in the return of the bellows to its normal contracted position following each expansion operation to thereby separate the clutch plates.

3. Apparatus as defined in claim 2, and means for regulably controlling the tension of the spring to thereby predetermine the application torque applied to the closure caps.

References Cited in the file of this patent
UNITED STATES PATENTS

| | | |
|---|---|---|
| 1,614,042 | Pennock et al. | Jan. 11, 1927 |
| 2,744,368 | Everett | May 8, 1956 |